United States Patent Office 3,309,410
Patented Mar. 14, 1967

3,309,410
ISOMERIZATION PROCESS
Alan Schriesheim, Berkeley Heights, and Charles A. Rowe, Jr., Elizabeth, N.J., assignors to Esso Research and Engineering Company, a corporation of Delaware
No Drawing. Filed Oct. 6, 1964, Ser. No. 402,019
13 Claims. (Cl. 260—666)

The present invention relates to the production of certain conjugated diolefins and more particularly to the conversion of 4-vinyl-1-cyclohexene to 3-ethylidene-1-cyclohexene and certain other conjugated diolefin isomers.

The preparation of novel or unusual polymer precursors is always desirable particularly since new polymers and copolymers that may be prepared therefrom always present the possibility of possessing unique properties. It is becoming increasingly difficult to discover cheap, readily available sources of the somewhat unusual polymer precursors.

Interest has recently arisen in the preparation of conjugated diolefins which have a two carbon chain attached to a cyclohexene ring and particularly 3-ethylidene-1-cyclohexene. It has been proposed that 4-vinyl-1-cyclohexene, which can be readily prepared from butadiene by a Diels-Alder type of reaction, be converted to an isomeric conjugated diolefin product which has one of the double bonds in the six-carbon atom ring and one associated with the side chain. U.S. Patent No. 3,080,432 proposes to carry out this conversion by contacting a nonconjugated vinyl cyclohexene, having the vinyl group in either the 3- or 4-position, in liquid phase at temperatures of $-40°$ C. to $+40°$ C. with a sodium on alumina catalyst containing either 0.1–3 wt. percent or 8–30 wt. percent of sodium.

It is indicated in the aforesaid patent that under most conditions within the ranges specified, ethyl benzene is also formed as a product and that under certain conditions styrene will appear in the product if too long a reaction time is permitted. Either of these results is undesirable since the ethyl benzene formed is not a polymer precursor yet may represent about 22% of the final product and the styrene is not separable from the conjugated diolefin product by distillation. Further in accordance with this patent, only by operating at very low temperatures, e.g. $-15°$ to $+10°$ C. and at low conversions can selectivity to conjugated diolefins be optimized. Moreover, the sodium on alumina catalysts used are extremely difficult to work with being very sensitive to air, moisture and feed impurities.

It is the object of this invention to provide a novel method for the conversion of nonconjugated vinyl cyclohexenes to 3-ethylidene-1-cyclohexene and certain isomeric conjugated diolefins.

It is a further object of this invention to convert 4-vinyl-1-cyclohexene to 3-ethylidene-1-cyclohexene and other conjugated dolefin isomers.

It is also an object of this invention to provide a process for the conversion of nonconjugated vinyl cyclohexenes to conjugated diolefins at substantially 100% selectivity.

These and other objects will appear more clearly from the detailed specification and claims which follow.

It has now been found that nonconjugated cyclic diolefins can be converted to conjugated diolefin isomers in high selectivities and yields by treatment thereof with particular solvent-base systems. It has been found that by the use of these solvent-base systems, the isomerization reaction, proceeding by the carbanion mechanism, occurs at commercially acceptable reation rates in spite of the fact that the carbanion reaction involves weakly ionizable C–H bonds.

Nonconjugated cyclic diolefins which may be treated in accordance with the present invention include 4-vinyl-1-cyclohexene and 3-vinyl-1-cyclohexene, obtainable by the thermal dimerization of butadiene, dipentene and 1-methyl-5-propenyl-2-cyclohexene, the dimer obtained from piperylene. The reaction is one of a simple isomerization which, in the case of 4-vinyl-1-cyclohexene may be illustrated as follows:

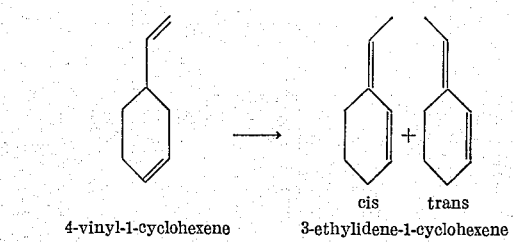

4-vinyl-1-cyclohexene     3-ethylidene-1-cyclohexene
                                  cis    trans Other possible isomers which may be formed are:

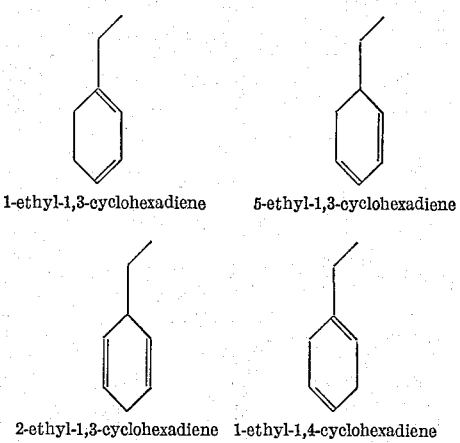

1-ethyl-1,3-cyclohexadiene    5-ethyl-1,3-cyclohexadiene 2-ethyl-1,3-cyclohexadiene    1-ethyl-1,4-cyclohexadiene An example of the potential use that such a conjugated diolefin could have is illustrated by the cationic polymerization scheme shown below.

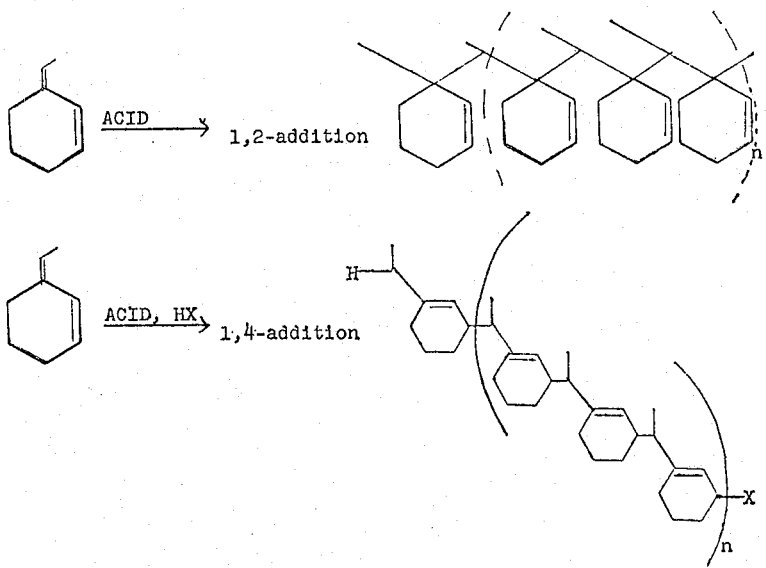

The conjugated diolefin products formed in accordance with the present invention could be oxidized, epoxidized, halogenated, etc. to yield a host of chemicals.

The base employed in these base-solvent systems may be any of a wide variety of materials. The only limitation on this material is that it have sufficient basicity to permit the reactions to proceed. Examples of suitable bases include metal hydrides, such as sodium hydride, metal inorganic amides, such as sodium methyl amide; metal alkoxides, such as sodium methoxide or ethoxide, potassium t-butoxide; metal hydroxides, such as sodium, potassium or cesium hydroxide; and alkali metal alkyls such as sodium ethyl or butyl lithium. Particularly preferred are bases composed of the heavy alkali metals, e.g. potassium, cesium and rubidium. Furthermore, where the base has an alkyl group, effectiveness is increased by increasing the number of carbon atoms. For example, $KOC_2H_5$ is more effective than $KOCH_3$ and KO t-butylate is more effective than both. This listing is by way of illustration only, since other suitable bases will readily occur to those skilled in the art.

The particular solvent employed is of critical importance. These solvents may be defined as having the following characteristics: (1) aprotic, that is, they must neither donate nor readily accept a proton; (2) a high dielectric constant, that is they must have an $\epsilon$ greater than 15 debyes at 25° C.; (3) dipolar; and (4) nonhydroxylic. Obviously, the solvents employed in the instant invention must be base stable, i.e. resistant to decomposition in the presence of the base and the reactants.

These solvents include organic compounds having the following dipolar groups: (1) a carbonyl, a divalent CO radical; (2) phosphoryl, a trivalent PO radical; (3) sulfinyl or sulfoxide, the divalent SO radical, (4) the sulfonyl or sulfone, the bivalent $SO_2$ radical; (5) and thiocarbonyl, the divalent CS radical. Solvents which meet these criteria are dipolar compounds such as alkyl sulfoxides such as dimethyl sulfoxide and diisopropyl sulfoxide; thiophenes such as tetrahydrothiophene-1,1,-dioxide; alkyl formamide such as N,N-dimethyl formamide; alkyl phosphoramides such as trimethyl- and hexamethylphosphoramides and thioureas such as N,N'-dimethylthiourea.

The reaction phase may be either homogeneous or heterogeneous depending upon the particular base-solvent system used. Where the base is soluble in the solvent, such as various alkoxides (potassium t-butoxide), then the reaction is homogeneous in base and, if desired, may be homogeneous in the hydrocarbon. Practically, the reaction could be operated heterogeneously where the feed and product are separated by a simple mixer-settler operation. Certain bases, such as potassium hydroxide and sodium hydroxide, are insoluble and here a fixed bed might be used with the hydrocarbon and solvent contacting the solid base.

The particular ratios of solvent to base and base to reactant are dependent upon a variety of factors. For example, in homogeneous systems, it is desirable to have at least 10 weight percent of base dissolved in the solvent up to saturation. It is preferable that from 20 to 40 weight percent of the solvent-base system be composed of base. In heterogeneous base-solvent systems, since the base is practically insoluble, the amount of solvent present must be sufficient to ensure complete wetting of the surface of the base. More solvent may be used if it is desirable to dissolve the feed.

The ratio of the amount of the base to the reactants is also dependent upon a variety of factors, such as the particular base-solvent system and the reactant in question. However, this ratio should be adjusted so as to permit the reaction to run at a rate of at least 0.2 w./hr./w. This selection of variables can be readily determined by one skilled in the art.

In carrying out the reaction disclosed herein, temperatures between about 10 and about 300° C. may be used, most preferably from about 30 to 150° C. As would be expected, the higher temperatures accelerate the reaction; however, excessively high temperatures may be detrimental to the solvent-base system and the selectivity of the reaction. The time of reaction is generally between about 0.5 and 200 hours, preferably between 1 and 100 hours.

The following examples are illustrative of the present invention.

*Example 1*

1000 cc. of a 0.7 molar solution of potassium tertiary butoxide in dimethyl sulfoxide were charged to a stainless steel autoclave. 200 cc. of 4-vinyl-1-cyclohexene were then added to the base solvent system and mechanically stirred while maintaining the reaction mixture at 100° C. Cuts were taken from the reaction mixture at various intervals and analyzed.

An aliquot (1 cc.) of the isomerizate consisting of the isomerized material plus the solvent base combination is added to distilled water (5 cc.). The distilled water-isomerizate-solvent-base is thoroughly shaken with a small amount of pentane (0.5 cc.) and the whole placed in a Dry-Ice compartment. The water-solvent-base mixture freezes leaving a supernatent liquid composed of the hydrocarbon. This hydrocarbon is then analyzed by standard gas liquid partition chromatographic and infrared techniques.

The results obtained are summarized in Table 1.

TABLE I.—ANALYSIS OF VINYL CYCLOHEXENE ISOMERIZATE
[Mol. wt. percent]

| | Cut No. | | | | | |
|---|---|---|---|---|---|---|
| | 1 | 2 | 3 | 4 | 5 | 6 |
| Time, Hrs | 1 | 3 | 5 | 29 | 50 | 75 |
| Product (mole percent): | | | | | | |
|  | 92.5 | 84.0 | 72.5 | 11.5 | 4.0 | 1.0 |
| 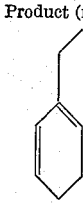 (cis and trans) | 6.0 | 13.5 | 21.0 | 73.0 | 79.0 | 83.0 |
| 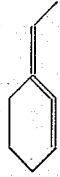 | 1.0 | 3.0 | 3.5 | 8.0 | 8.5 | 8.0 |

TABLE I—Continued

| | Cut No. | | | | | |
|---|---|---|---|---|---|---|
| | 1 | 2 | 3 | 4 | 5 | 6 |
| Time, Hrs | 1 | 3 | 5 | 29 | 50 | 75 |
| Product (mole percent):—Con. | | | | | | |
| 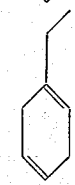 | 0 | 0.5 | 0.5 | 3.5 | 4.0 | 4.0 |
|  | 0.5 | 1.0 | 2.5 | 4.0 | 4.5 | 4.0 |

Results show a rapid, highly selective isomerization to yield a product containing only isomers of the starting compound. In addition, the last column (Cut 6) is indicative of the purity of yield of the cis and trans ethylenic material (83 mole percent of the product).

*Example 2*

4366 grams representing several composite batches of 4-vinyl-1-cyclohexene isomerizate prepared essentially in accordance with Example 1 were subjected to distillation in a 40 plate Pod column at a reflux ratio of 40/1 at atmospheric pressure under nitrogen. The results obtained are summarized in Table II.

TABLE II.—DISTILLATION OF COMPOSITES 4 VCH=1 ISOMERIZATIONS

| | Dist. Cut No. | | | | | | | | | | Btms. Vac. |
|---|---|---|---|---|---|---|---|---|---|---|---|
| | 0[1] | 1 | 2 | 3 | 4 | 5 | 6 | 7 | 8 | 9 | 10 | |
| V.T., °F | | 264–279 | 279–289 | 289–292 | 292–293 | 293–294 | 294–295 | 295–296 | 296–298 | 298 | 298 | |
| Gms. Prod | | 1,178 | 96 | 31 | 49 | 103 | 89 | 82 | 796 | 861 | 1,051 | 10 |
| Prod. Anal. Mol. Weight Percent: | | | | | | | | | | | | |
|  | 3.5 | 13.0 | 0 | 0 | 0 | 0 | 0 | 0 | 0 | 0 | 0 | |
| 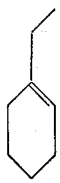 | 6.6 | 21.2 | 17.5 | 11.1 | 7.8 | 5.6 | 3.8 | 1.9 | 0 | 0 | 0 | |
| 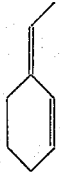 | 68.1 | 0 | 17.7 | 35.7 | 61.2 | 62.3 | 73.9 | 85.6 | 98.5 | 99.9 | 99.0 | |

See footnote at end of table.

TABLE II.—DISTILLATION OF COMPOSITES 4 VCH=1 ISOMERIZATIONS—Continued

| | | Dist. Cut No. | | | | | | | | | | Btms. Vac. |
|---|---|---|---|---|---|---|---|---|---|---|---|---|
| | 0[1] | 1 | 2 | 3 | 4 | 5 | 6 | 7 | 8 | 9 | 10 | |
| V.T., °F | | 264–279 | 279–289 | 289–292 | 292–293 | 293–294 | 294–295 | 295–296 | 296–298 | 298 | 298 | |
| Gms. Prod | | 1,178 | 96 | 31 | 49 | 103 | 89 | 82 | 796 | 861 | 1,051 | 10 |
| Prod. Anal. Mol. Weight Percent—Con.: | | | | | | | | | | | | |
|  | 5.3 | 17.2 | 13.4 | 8.1 | 5.3 | 4.2 | 2.8 | 1.3 | 0 | 0 | 0 | |
| 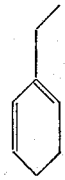 | 2.3 | 8.2 | 1.7 | 0.9 | 0.6 | 0.7 | 0.3 | 0 | 0 | 0 | 0 | |
| 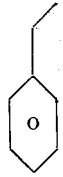 | 12.2 | 40.5 | 29.4 | 20.6 | 8.0 | 9.0 | 4.5 | 0 | 0 | 0 | 0 | |
| 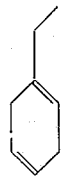 | 2.0 | 0 | 20.4 | 23.5 | 17.1 | 18.3 | 14.8 | 11.2 | 1.5 | 0.1 | 1.0 | |

[1] Analysis of composite before distillation.

As may be seen from the above data 4346 grams were recovered in the distillation or that distillation loss amounted to 20 grams. Also as may be seen from Cuts 8, 9 and 10, substantially pure 3-ethylidene-1-cyclohexene can be recovered by distillation and all the other isomers can therefore be recycled to extinction.

Example 3

2000 cc. of dimethylsulfoxide were charged to an autoclave and 156.8 grams of potassium tertiary butoxide were dissolved therein. 850 cc. of dipentene were then added to the base solvent system and mechanically stirred while maintaining the reaction mixture at 100° C. Cuts were taken from the reaction mixture at various intervals and the product was analyzed as in Example 1.

The results obtained are summarized in Table III.

TABLE III.—ANALYSIS OF DIPENTENE ISOMERIZATE

| | Cut No. | | | | | | | | |
|---|---|---|---|---|---|---|---|---|---|
| | 1 | 2 | 3 | 4 | 5 | 6 | 7 | 8 | 9 |
| Time, Hrs | 15 | 40 | 160 | 235 | 305 | 350 | 400 | 450 | 475 |
| Percent Dipentene | 90.5 | 83.5 | 48.5 | 37.0 | 27.0 | 22.5 | 17.0 | 13.0 | 8.0 |
| Percent $\Delta^{2:4(8)}$-p-Menthadiene | 2.0 | 3.5 | 14.0 | 17.5 | 20.0 | 21.0 | 22.5 | 24.0 | 24.5 |
| Percent p-Cymene | 3.0 | 3.0 | 3.0 | 3.0 | 4.0 | 4.5 | 4.0 | 5.0 | 6.5 |
| Percent γ-Terpinene | 0.5 | 1.5 | 7.5 | 9.5 | 13.0 | 13.0 | 12.5 | 12.0 | 12.0 |
| Percent α-Terpinene | 4.0 | 8.0 | 26.0 | 31.5 | 33.5 | 36.0 | 39.5 | 42.0 | 45.0 |
| Percent (Unidentified) | 0 | 0.5 | 1.0 | 1.5 | 2.5 | 3.0 | 3.5 | 3.0 | 3.0 |
| Percent 3-p-Menthene | 0 | 0 | 0 | 0 | 0 | 0 | 1.0 | 1.0 | 1.0 |

Example 4

5.0 cc. of a 0.7 molar solution of potassium tertiary butoxide in hexamethyl phosphoramide were charged to a vial whereupon 0.5 cc. of 4-vinyl-1-cyclohexene were added to the base solvent system. The reactants were agitated at essentially constant temperature and aliquot samples were withdrawn at different intervals and analyzed as in Example 1. Runs were conducted at 40° C., 55° C. and 85° C. The reaction conditions and the results obtained are summarized in Table IV.

TABLE IV

| | Run No. | | | | | | | | |
|---|---|---|---|---|---|---|---|---|---|
| | 516-13 | | | 516-13 | | | 516-13 | | |
| Feed | 4 VCH=1 | | | 4 VCH=1 | | | 4 VCH=1 | | |
| Cc | 0.5 | | | 0.5 | | | 0.5 | | |
| Solvent | | | | HMPA | | | | | |
| Base | | | | KOTBU | | | | | |
| Molarity Base | | | | 0.7 | | | | | |
| Cc. Solution | | | | 5.0 | | | | | |
| Temp. °C | 40 | | | 55 | | | 85 | | |
| K, sec. $^{-1}$ | $1.54 \times 10^{-5}$ | | | $4.69 \times 10^{-5}$ | | | $7.63 \times 10^{-4}$ | | |
| Time, Min | 20 | 120 | 210 | 15 | 30 | 45 | 4 | 8 | 12 |
| Prod. Anal. Mole Percent: | | | | | | | | | |
| 4 VCH=1 | 96.67 | 90.00 | 82.62 | 94.89 | 91.66 | 88.23 | 79.5 | 7.102 | 57.34 |
| 1-ethyl-1,4-cyclohexadiene | 0.32 | 0.76 | 1.10 | 0.53 | 0.81 | 1.13 | 1.90 | 3.13 | 3.94 |
| Cis-3-ethylidene-1-cyclohexene | 1.08 | 4.26 | 8.16 | 1.84 | 3.76 | 5.67 | 10.07 | 15.05 | 23.24 |
| Trans-3-ethylidene-1-cyclohexene | 1.27 | 3.88 | 6.53 | 1.82 | 2.87 | 3.92 | 6.06 | 9.33 | 12.23 |
| 1-ethyl-1,3-cyclohexadiene | 0.12 | 0.29 | 0.40 | 0.28 | 0.20 | 0.15 | 0.15 | 0.17 | 0.19 |
| 2-ethyl-1,3-cyclohexadiene | 0.54 | 0.81 | 1.19 | 0.65 | 0.70 | 0.90 | 0.98 | 1.29 | 3.06 |

$\Delta E = 20.14$ kcal./mole.

What is claimed is:

1. A method of converting nonconjugated cyclic diolefins to cyclic conjugated diolefin isomers wherein both the nonconjugated and conjugated diolefins contain one double bond within the cyclic structure and one double bond on a substituent side chain, in high selectivities and yields which comprises maintaining a nonconjugated cyclic diolefin in contact with a base-solvent system wherein said solvent is an aprotic, dipolar, nonhydroxylic organic liquid having a dielectric constant in excess of 15 debyes at 25° C. and said base is selected from the group consisting of alkali metal hydrides, inorganic amides, alkoxides, hydroxides, and alkyls at temperatures of from about 10 to 300° C. and for a period sufficient to convert the same principally to conjugated diolefin isomers.

2. The method which comprises maintaining a compound selected from the group consisting of 4-vinyl- and 3-vinyl-1-cyclohexene in contact with a base-solvent system wherein said solvent is an aprotic, dipolar, nonhydroxylic organic liquid having a dielectric constant in excess of 15 debyes at 25° C. and said base is selected from the group consisting of alkali metal hydrides, inorganic amides, alkoxides, hydroxides, and alkyls at a temperature of from about 30 to 150° C. for a period sufficient to convert the same principally to the conjugated diolefin 3-ethylidene-1-cyclohexene.

3. The method as defined in claim 2 wherein the aprotic solvent is dimethyl sulfoxide.

4. The method as defined in claim 3 in which the base is potassium tertiary butylate.

5. The method as defined in claim 2 wherein the aprotic solvent is hexamethylphosphoramide.

6. The method as defined in claim 5 in which the base is potassium tertiary butylate.

7. The method which comprises maintaining dipentene in contact with a base-solvent system wherein said solvent is an aprotic, dipolar, nonhydroxylic organic liquid having a dielectric constant in excess of 15 debyes at 25° C. and said base is an alkali metal alkoxide at a temperature of from about 30 to 150° C. for a period sufficient to convert the same principally to conjugated diolefinic isomers.

8. The method as defined in claim 7 wherein the aprotic solvent is dimethyl sulfoxide.

9. The method as defined in claim 7 wherein the aprotic solvent is hexamethylphosphoramide.

10. The method which comprises maintaining 1-methyl-5-propenyl-2-cyclohexene in contact with a base-solvent system wherein said solvent is an aprotic, dipolar, nonhydroxylic organic liquid having a dielectric constant in excess of 15 debyes at 25° C. and said base is an alkali metal alkoxide at a temperature of from about 30 to 150° C. for a period sufficient to convert the same principally to conjugated diolefinic isomers.

11. The method as defined in claim 10 wherein the aprotic solvent is dimethyl sulfoxide.

12. The method as defined in claim 10 wherein the aprotic solvent is hexamethylphosphoramide.

13. The method as defined in claim 7 wherein the base is potassium tertiary butylate.

References Cited by the Examiner

UNITED STATES PATENTS 3,213,155  10/1965  Schriesheim et al. ___ 260—680
3,217,050  11/1965  Schriesheim et al. ___ 260—680

DELBERT E. GANTZ, *Primary Examiner.*

V. O'KEEFE, *Assistant Examiner.*